United States Patent [19]

Sato et al.

[11] Patent Number: 4,771,157
[45] Date of Patent: Sep. 13, 1988

[54] ELECTRICAL DISCHARGE MACHINING APPARATUS FOR FORMING MINUTE HOLES IN A WORKPIECE

[75] Inventors: Takeo Sato, Sagamihara; Nobuhiro Araki, Kawasaki; Hisato Matsushita, Yokohama; Koichi Kawata, Tokyo, all of Japan

[73] Assignee: Matsushita Electric Industrial Co., Ltd., Osaka, Japan

[21] Appl. No.: 612,012

[22] Filed: May 18, 1984

[30] Foreign Application Priority Data

May 19, 1983 [JP] Japan ................................. 58-88529

[51] Int. Cl.⁴ ........................... B23H 1/00; B23H 7/26
[52] U.S. Cl. ............................... 219/69 R; 219/69 E; 219/69 V; 219/69 G
[58] Field of Search ............... 219/69 V, 69 G, 69 E, 219/68, 69 R; 269/56, 58, 59; 204/224 M

[56] References Cited

U.S. PATENT DOCUMENTS

| 1,061,612 | 5/1913 | Heroult | 219/69 G |
|---|---|---|---|
| 2,851,910 | 9/1958 | Zwick et al. | 269/58 |
| 2,895,354 | 7/1959 | Hawkinson et al. | 269/56 |
| 3,247,599 | 4/1966 | O'Connor | 219/69 G |
| 3,388,232 | 6/1968 | Dreisin | 219/69 M |
| 3,403,084 | 9/1968 | Andrews | 204/143 |
| 3,440,156 | 4/1969 | Dickson | 219/69 G |
| 3,474,215 | 10/1969 | Johanson | 219/69 E |
| 3,506,800 | 4/1970 | O'Connor | 219/69 V |
| 3,510,620 | 5/1970 | Smith | 219/69 G |
| 3,541,291 | 11/1970 | Johanson | 219/69 G |
| 3,639,071 | 1/1972 | Breitkopf et al. | 269/56 |
| 3,649,801 | 3/1972 | Cardell et al. | 219/68 |
| 3,657,507 | 4/1972 | McNeece | 219/69 G |
| 3,725,631 | 4/1973 | Angelucci et al. | 219/69 V |
| 3,806,691 | 4/1974 | Roach | 219/69 G |
| 4,123,645 | 10/1978 | Shichida et al. | 219/69 W |
| 4,239,445 | 12/1980 | Ozawa | 269/56 |
| 4,353,170 | 10/1982 | Jordan | 269/58 |
| 4,393,292 | 12/1983 | Inoue | 219/69 M |
| 4,439,660 | 3/1984 | Inoue | 219/69 M |
| 4,449,027 | 5/1984 | Fujikawa | 219/69 E |

FOREIGN PATENT DOCUMENTS

| 1565554 | 6/1975 | Fed. Rep. of Germany . | |
|---|---|---|---|
| 2721576 | 11/1978 | Fed. Rep. of Germany . | |
| 2851349 | 10/1979 | Fed. Rep. of Germany | 219/69 R |
| 3032604 | 3/1981 | Fed. Rep. of Germany . | |
| 3203605 | 9/1982 | Fed. Rep. of Germany . | |
| 56-45326 | 4/1981 | Japan | 219/69 R |
| 138545 | 8/1982 | Japan | 219/69 E |
| 366439 | 2/1963 | Switzerland . | |
| 843548 | 8/1960 | United Kingdom | 219/69 G |
| 2069396 | 8/1981 | United Kingdom . | |
| 238042 | 6/1971 | U.S.S.R. | 219/69 R |

Primary Examiner—A. D. Pellinen
Assistant Examiner—Geoffrey S. Evans
Attorney, Agent, or Firm—Lowe, Price, LeBlanc, Becker & Shur

[57] ABSTRACT

An electrical discharge machining apparatus for forming minute holes in a workpiece has a machining electrode supported in V-shaped grooves for forming a minute hole through an electrical discharge between the machining electrode and the workpiece. The machining electrode is movable toward and away from the workpiece. The workpiece is movable between a position below the machining electrode and a position below a microscope disposed in conjugate relation to the machining electrode. After a position to be machined has been set by the positioning means, the workpiece is moved to the position below the machining electrode for electrical discharge machining. The machining electrode is subjected to little displacement while it is being rotated, and the position to be machined can be determined with high accuracy. The electrical discharge machining apparatus can quickly form a neat minute hole of small out-of-roundness and reduced surface roughness in the workpiece at a correct position thereon.

20 Claims, 8 Drawing Sheets

ELECTRICAL DISCHARGE MACHINING APPARATUS FOR FORMING MINUTE HOLES IN A WORKPIECE

BACKGROUND OF THE INVENTION

The present invention relates to an apparatus for forming minute holes in a workpiece through an electrical discharge machining (EDM) or electroerosive machining process.

Electrical discharge machining (EDM) has conventionally been deemed inappropriate for forming minute holes in a workpiece for the reasons that machining accuracies such as surface roughness and out-of-roundness become more and more problematic as the diameter of a hole formed is smaller, and it is difficult to feed the electrode in minute steps.

Conventional EDM machines employ a ball-and-roller bearing by which the electrode is rotatably supported. The ball-and-roller bearing however cannot avoid displacements of the electrode by a few micrometers. The electrode assembly comprises a spindle construction as a whole which has a large stray capacity and hence cannot reduce the capacitance of an RC circuit. Where holes having a diameter of about 50 micrometers are formed by such an electrode assembly, accuracies such as out-of-roundness and surface roughness become extremely poor. The electrode assembly is heavy and its speed of response for feeding the electrode is necessarily reduced. Therefore, the electrode assembly has no smooth machining capability, and can machine holes in a practical range of diameters down to about 100 micrometers at minimum.

Another problem with the prior EDM machines is that it is quite a complex task to position the electrode accurately for forming a minute hole. Two processes have been available for positioning the machining electrode and workpiece with respect to each other in forming a hole having a diameter of 0.3 mm or smaller.

One positioning process is known as a contact sensing process in which an electric short circuit is sensed between the machining electrode and the workpiece, a contact position is read on a position scale or the like, and the electrode and the workpiece are relatively moved to a desired position according to the reading on the position scale. According to this process, a weak voltage is applied between a machining electrode and a workpiece placed in an insulative liquid contained in a machining bath on an X-Y table, while at the same time the machining electrode is moved horizontally toward the workpiece. When the machining electrode contacts the workpiece, a shortcircuiting current flowing between the machining electrode and the workpiece is detected and the reading on the position scale at this time is set as 0. Assuming that a desired position where a hole is to be pierced is spaced a distance a in the direction of X from the position in which the workpiece and the machining electrode are in contact with each other, the X-Y table is moved a distance $a+d/2$ in the direction of X taking the diameter d of the machining electrode into account, so that the central axis of the machining electrode will be in registration with the desired position. When the X-Y table is moved another distance $b+d/2$ in the direction of Y, the center of the machining electrode is brought accurately into registration with another position in which to pierce another hole.

The above process can provide a sufficient degree of accuracy where the machining electrode has a relatively large diameter. However, in case the machining electrode has a diameter of a few tens micrometers for forming minute holes, the electrode lacks desired rigidity and tends to flex upon contact with the workpiece, resulting in the failure of accurate positioning.

Another positioning process uses a stereomicroscope for observing the tip of the machining electrode and the workpiece while positioning them relatively to each other. This positioning process however also fails to effect accurate positioning because of the parallax since the workpiece is obliquely observed.

SUMMARY OF THE INVENTION

It is an object of the present invention to provide an electrical discharge machining apparatus for forming minute holes in a workpiece, which will eliminate the drawbacks of the conventional EDM apparatus.

Another object of the present invention is to provide an electrical discharge machining apparatus for forming minute holes in a workpiece, which requires no spindle construction, has a light and small-size electrode assembly, has an electrode support electrically insulated from the other parts for greatly reducing a stray capacity, and hence is capable of forming minute holes of small surface roughness and out-of-roundness and diameters ranging from 10 to 200 micrometers at high machining speeds.

Still another object of the present invention is to provide an electrical discharge machining apparatus for forming minute holes in a workpiece, which presents no parallax and can position a thin machining electrode relative to a workpiece with high accuracy.

According to the present invention, there is provided an electrical discharge machining apparatus for forming a minute hole in a workpiece, comprising a machining electrode for forming the minute hole in the workpiece by an electrical discharge between the machining electrode and the workpiece, a machining electrode moving means for moving the machining electrode toward and away from the workpiece, a positioning means for establishing a machining position with respect to the workpiece, and a workpiece moving means for moving the workpiece between a first position below the machining electrode and a second position below the positioning means. The machining electrode is supported by a support means having V-shaped grooves and will be rotated at a constant speed while an electrical discharge is produced between the machining electrode and the workpiece. The machining position can be established by piercing a minute hole in the workpiece at any desired position, moving the workpiece to the position below the positioning means to bring the pierced minute hole into alignment with a prescribed position in the field of view of a microscope so that the positions directly below the machining electrode and the microscope will be in conjugate relationship, then setting a position in which to machine the workpiece at the prescribed position in the field of view of the microscope, and thereafter returning the workpiece to the position directly below the machining electrode.

BRIEF DESCRIPTION OF THE INVENTION

The present invention will be described in detail by way of illustrative example with reference to the accompanying drawings, in which.

DETAILED DESCRIPTION

Figure 1:
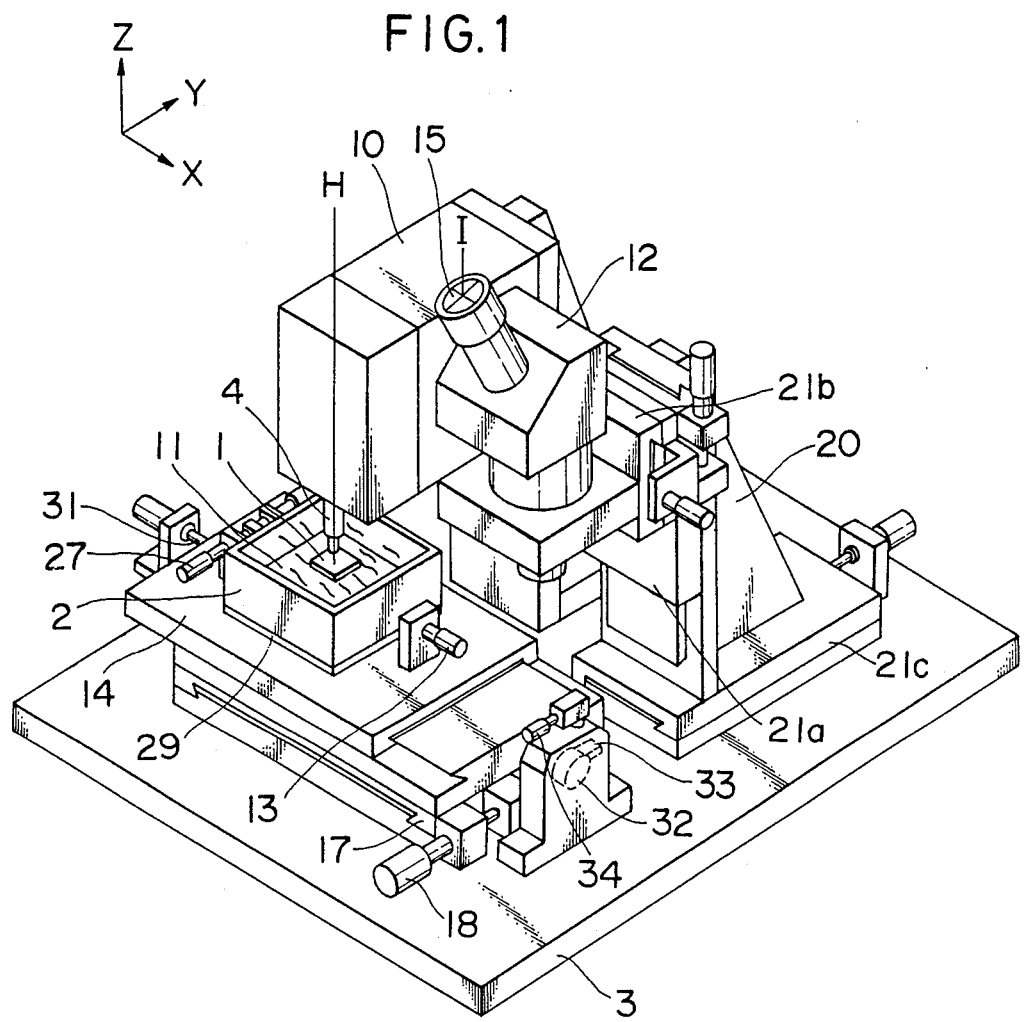
FIG. 1 is a perspective view of an electrical discharge machining apparatus for forming minute holes in a workpiece according to the present invention.

FIG. 1 shows an overall arrangement of an electrical discharge machining (EDM) apparatus for forming minute holes in a workpiece according to the present invention.

The electrical discharge machining apparatus includes a machining electrode 4 and a machining head 10 supporting the machining electrode 4. A workpiece 1 is placed on a support base 11 disposed in a machining bath 2. As the machining electrode 4 is moved toward the workpiece 1 while rotating the machining electrode 4, an electrical discharge is initiated between the machining electrode 4 and the workpiece 1. A minute hole can be formed in the workpiece 1 by successively feeding the machining electrode 4 toward the workpiece 1.

The EDM apparatus also includes a positioning microscope 12 movable in three directions, that is, X and Y directions extending parallel to a base 3 and perpendicularly to each other, and a Z direction extending perpendicularly to the base 3 and the X and Y directions.

The machining bath 2 can be fed in the X direction by sliding a slide plate 29 of the bath 2 on a slide table 14 with a fine adjustment screw 13. The machining bath 2 can be angularly adjusted in an X-Y plane with a fine adjustment screw 27. The slide table 14 can be moved in the X direction until it abuts against stoppers 31, 32. When the slide plate 14 is fixed in abutment against the stopper 31, the workpiece 1 is positioned directly below the machining electrode 4. When the slide plate 14 is fixed in abutment against the stopper 32, the workpiece 1 is positioned directly below the microscope 12. An eccentric cam 33 is angularly movable by a lever 34 as described later on. A table 17 movable in the Y direction is disposed beneath the slide table 14 and can be moved by a feed screw 18. The machining bath 2, the slide table 14, and the table 17 jointly constitute a support base assembly. The machining head 10, the microscope 12, and the support base assembly are mounted individually on the base 3.

The microscope 12 is mounted on a holder having a slide mechanism having three slides. More specifically, a slide 21a extends in a direction perpendicular to the workpiece 1 or the Z direction for adjusting the focus of the microscope 12. The slide 21a can be replaced with a mechanism for moving an objective lens of the microscope upwardly and downwardly. A slide 21b serves to move the microscope 12 in the same direction as that of movement of the slide table 14, or the X direction. A slide 21c serves to move the microscope 12 in a direction, or the Y direction, normal to the direction in which the slide table 14 moves. The microscope 12 has an eyepiece bearing cross hairs 15 which will appear in the field of view of the viewer, the intersection of the cross hairs 15 serving as a sight.

Figure 2:
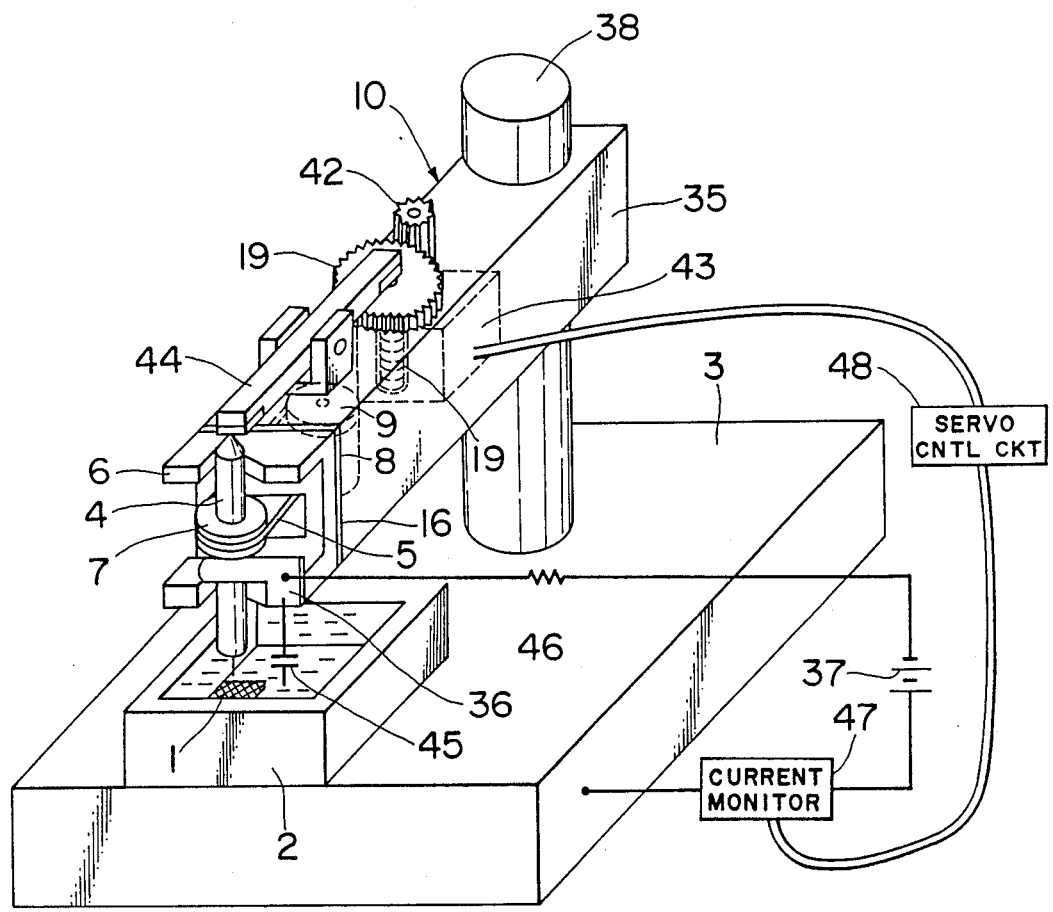
FIG. 2 is a perspective view of a machining head in the electrical discharge machining apparatus of FIG. 1.

FIG. 2 shows the machining head 10 in greater detail. The machining electrode 4 is rotatably supported by a support or bearing 6 having V-shaped grooves, and will be rotated by a belt 5 trained around a pulley 7 on the machining electrode 4 and a pulley 9 on a motor 8, while at the same time the machining electrode 4 is held against the bearing 6. Since the pulley 9 is located upwardly of the pulley 7, the machining electrode 4 is biased to move upwardly under the tension of the belt 5 while being rotated by the motor 8. The machining electrode 4, the bearing 6, and the pulley 7 jointly constitute an electrode assembly electrically insulated by an insulator 16 as of ceramics from a body 35 of the machining head 10. The electrode assembly is electrically connected to a DC power supply 37 by means of a brush 36.

The machining electrode 4 can be fed selectively in two modes, that is, rough feeding and fine feeding. In the rough feeding mode, the body 35 is vertically slid along a post 38 on the base 3 to bring the machining electrode 4 together with the body 35 to a position near the workpiece 1 disposed in the machining bath 12. Thereafter, in the fine feeding mode, a pinion gear 42 is rotated by a motor 43 to rotate a gear 19a integral with a feed screw 19 for thereby vertically moving the feed screw 19, causing a pivot lever 44 to move the machining electrode 4 for a small vertical interval.

A machining circuit is composed of the DC power supply 37, a capacitor 45, and a resistor 36 through which the brush 36 is connected to the DC power supply 37. A machining current flowing through the machining circuit is detected by a current monitor 47 and utilized for enabling a servo control circuit 47 to control the speed and direction of rotation of the motor 43 for controlling the speed and direction of fine feeding movement of the machining electrode 4. When an ordinary electrical discharge is generated between the machining electrode 4 and the workpiece 1, the motor 43 is rotated counterclockwise at a prescribed constant speed to feed the machining electrode 4 at a predetermined speed toward the workpiece 1. When the machining electrode 4 and the workpiece 1 in the machining bath 2 are short-circuited, the current monitor 47 detects a short-circuiting current and causes the servo control circuit 48 to rotate the motor 43 clockwise at a high speed for moving the machining electrode 4 away from the workpiece 1 at a high speed. After the short circuit has been eliminated, the motor 43 is rotated counterclockwise again to feed the machining electrode 4 at the prescribed speed toward the workpiece 1. The workpiece 1 is progressively machined while the above cycle of operation is repeated.

Figure 3A:
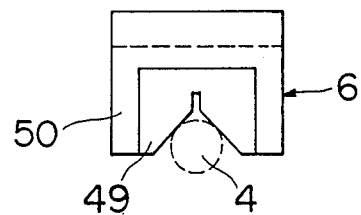
FIGS. 3A and 3B are plan and front elevational views of a support for the machining electrode.
Figure 3B:
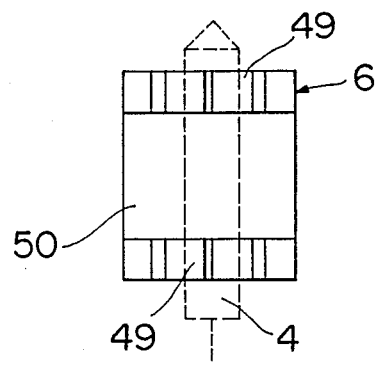

FIGS. 3A and 3B illustrate the bearing 6 in greater detail. The bearing 6 is composed of two upper and lower V-grooved members 49 attached to a support body 50 and having V-shaped grooves or notches in which the machining electrode 4 is disposed and held against the V-grooved members 49. The V-grooved members 49 are made of ruby in the illustrated embodiment, but may also be made of hard metal, sapphire, diamond, quenched steel, or other wear-resistant materials. The V-grooved members 49 and the support body 50 may be of an integral construction of the same material.

Figure 4A:
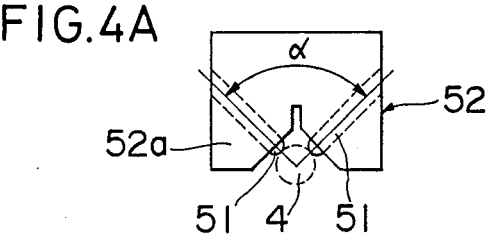
FIGS. 4A and 4B are plan and front elevational views of a machining electrode support according to another embodiment of the present invention.
Figure 4C:
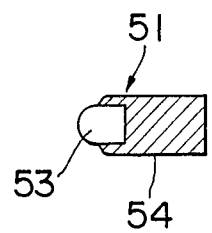
FIG. 4C is a cross-sectional view of a protruding member in the machining electrode support illustrated in FIGS. 4A and 4B.
Figure 4B:
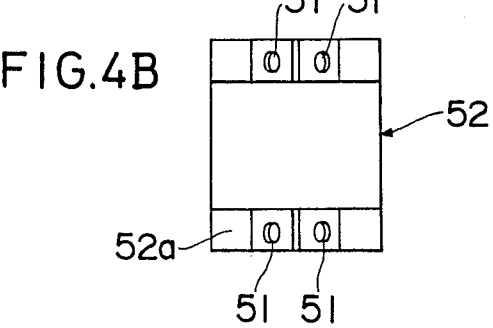

FIGS. 4A, 4B, and 4C show a support or bearing 52 according to another embodiment of the invention for supporting the machining electrode 4 through a pivot bearing construction. The bearing 52 has upper and lower V-grooved or notched members 52*a* each accommodating two protruding members 51 having semispherical distal ends projecting on surfaces defining the V-shaped groove. The machining electrode 4 is therefore supported by the four protruding members 51. Each V-shaped groove should preferably have an opening angle $\alpha$ in the range of from 30° to 150°. As shown in FIG. 4C, the protruding member 51 has a semispherical member 53 and a cover body 54 in which the semispherical member 53 is partly embedded. The cover body 54 is threaded or fitted in a hole defined in the V-grooved member 52*a*. The semispherical member 53 is made of ruby in the illustrated embodiment, but may also be made of a highly wear-resistant material. The member 53 may be flat at the distal end.

Figure 5:
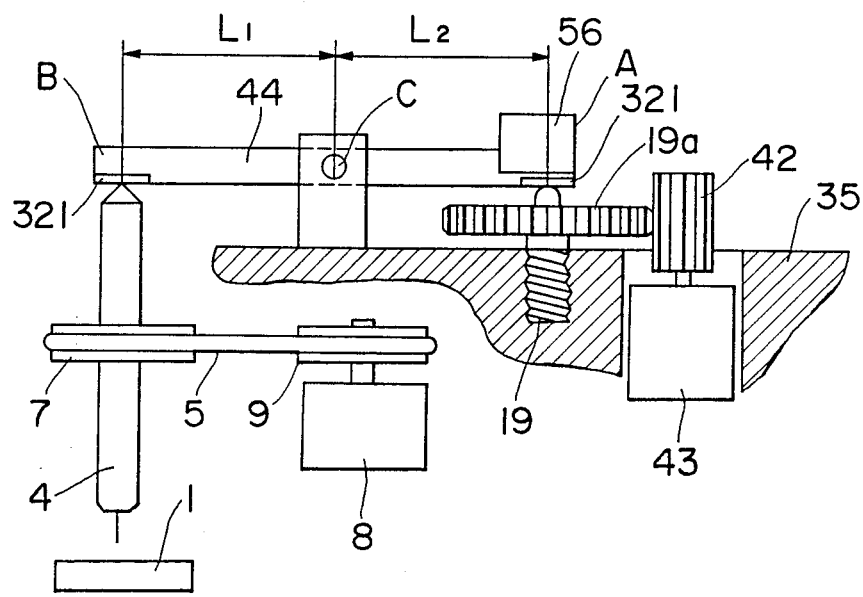
FIG. 5 is a schematic side elevational view, partly in cross section, of a machining electrode moving mechanism in the electrical discharge machining apparatus.

FIG. 5 illustrates the fine feed mechanism in greater detail. The lever 44 is pivotally supported by a pivot C. The machining electrode 4 and the feed screw 19 have semispherical or conical ends held pivotally against contact members 321 on the lever 44 which are made of a highly wear-resistant material. The contact members 321 are in the form of sapphire blocks in the illustrated embodiment, but may be made of ruby, diamond, ultra high strength steel, or quenched steel, for example.

The feed screw 19 has an externally threaded lower portion threaded in an internally threaded hole in the body 35. Upon rotation of the motor 43, the pinion 42 and the gear 19*a* meshing therewith are rotated to cause the feed screw 19 to move vertically as the gear 19*a* meshingly engages the pinion 42 at different positions. The vertical movement of the feed screw 19 is transmitted through the lever 44 to the machining electrode 4 which is then fed in its axial direction.

In the present embodiment, the feed gear 19*a* and the pinion 42 have a gear ratio of 5:1, the external threads on the feed screw 19 comprise righthand screw threads having a pitch of 0.5 mm, and the pinion 42 has a teeth length of 10 mm. When the motor 43 rotates counterclockwise, the feed screw 19 is rotated clockwise at a speed which is 1/5 of the speed of rotation of the motor 43, and is moved upwardly by a distance of 0.1 mm per revolution of the motor 43. The maximum distance the feed screw 19 can move vertically is determined by the teeth length of the pinion 42. As a result, an end A of the lever 44 which contacts the feed screw 19 is lifted upwardly by a distance of 0.1 mm. With the lever 44 having a leverage $L_1:L_2=1:1$ in the illustrated embodiment, an end B of the lever 44 opposite to the end A is depressed by a distance of 0.1 mm.

The machining electrode 4 is operatively connected to the motor 8 by the pulleys 7, 9 and the belt 5. Since the machining electrode 4 is normally biased upwardly by the belt 5, the machining electrode 4 is held in contact with the lever 44 at all times. Accordingly, the vertical displacement of the lever end A is equal to the distance the machining electrode 4 is fed vertically. The foregoing mode of operation is effected when a stable electrical discharge is produced. When the workpiece 1 and the machining electrode 4 are short-circuited, the motor 43 is rotated clockwise to lift the machining electrode 4 off the workpiece 1. The tension of the belt 5 can be reduced by a weight 63 attached to the end A of the lever 44.

Figure 6:
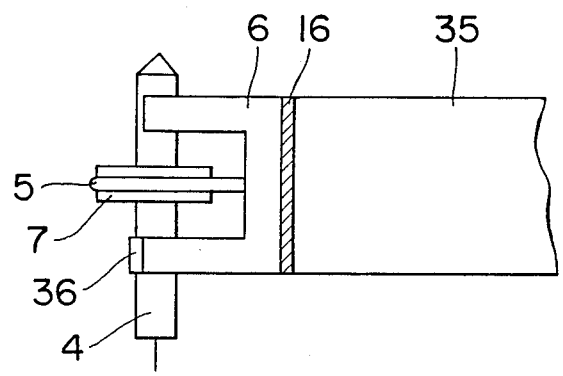
FIG. 6 is a fragmentary side elevational view of the machining head.

FIG. 6 shows the manner in which the bearing 6 is electrically insulated for reducing any stray capacity and the brush 36 is in contact with the machining electrode 4. The body 35, and the machining electrode 4 and the bearing 6 are electrically insulated by the insulator 16 which is made of ceramics, paper, vinyl, or glass, for example. The machining electrode 4 and the machining power supply are held in electric contact directly by means of the brush 36. This arrangement allows the discharge circuit small in size to reduce any stray capacity which would influence electrical discharge machining.

Figure 7:
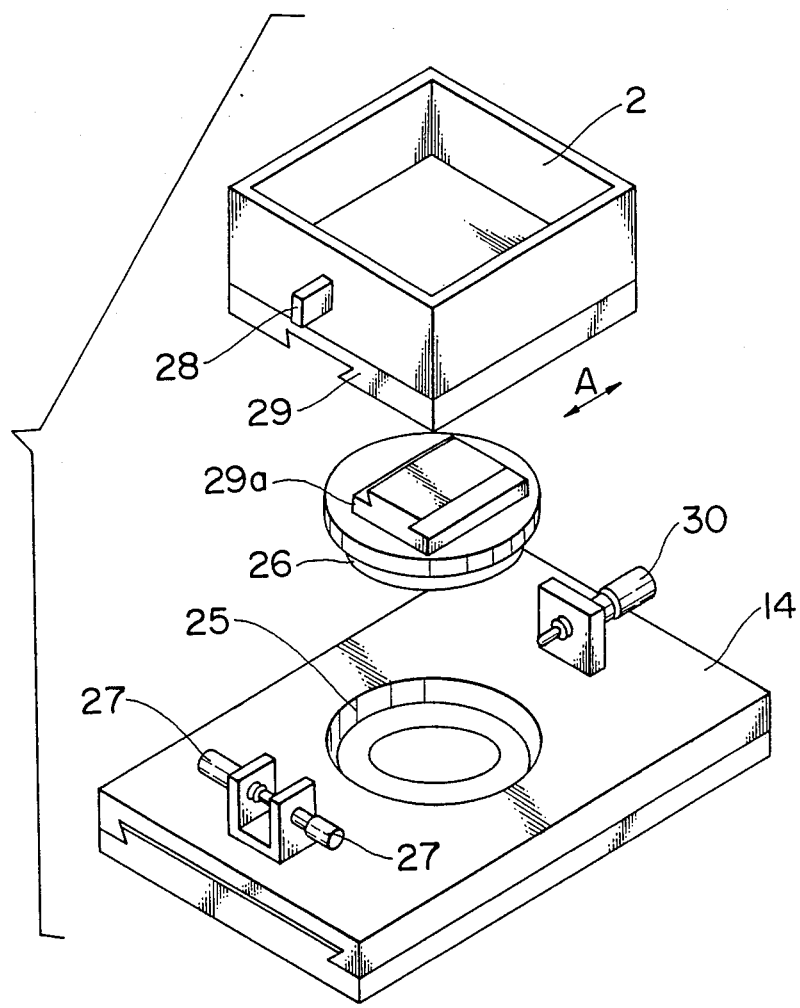
FIG. 7 is an exploded perspective view of a fine adjustment mechanism for positioning a workpiece in the electrical discharge machining apparatus.

The machining bath 2 and the slide table 14 are illustrated in greater detail in FIG. 7.

A rotatable slide 26 is mounted on the underside of the machining bath 2 and has a cylindrical portion slidably fitted in a hole 25 defined in an upper surface of the slide table 14. By pushing a projection 28 on the machining bath 2 with the adjustment screw 27, the machining bath 2 is angularly moved through a small angle about its center through the slidable fitting engagement between the slide 26 and the slide table 14. A ball bearing may be disposed between the slide 26 and the slide table 14 instead of fitting engagement therebetween. The machining bath 2 is movable in the direction of the arrow A (corresponding to the X direction in FIG. 1) by the slide plate 29 attached to the underside of the machining bath 2 and guided by a guide 29*a* on the slide 26. The distance that the machining bath 2 is moved in the A direction can be adjusted by a feed screw 30.

Figure 8:
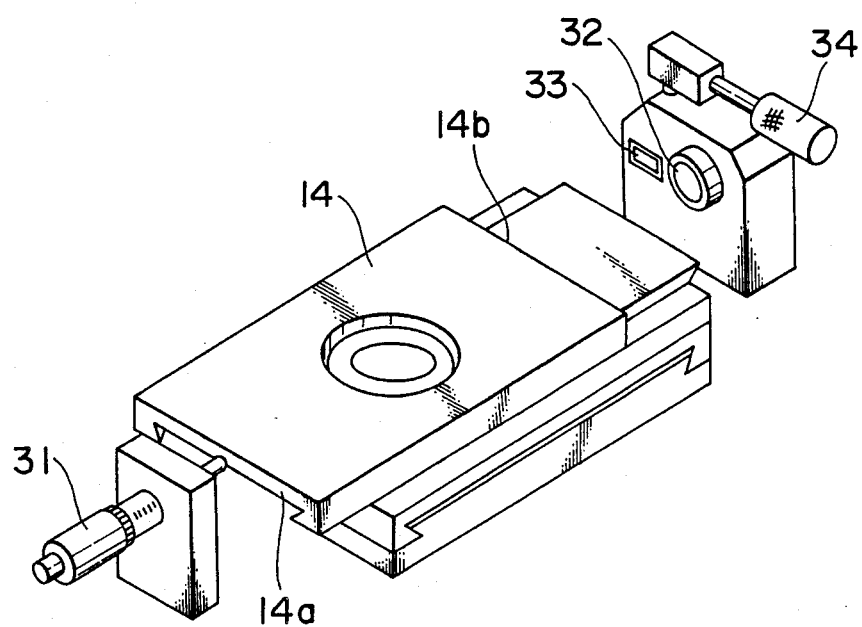
FIG. 8 is a perspective view of a workpiece moving mechanism in the electrical discharge machining apparatus.

FIG. 8 shows the stoppers 31, 32 for the slide table 14. The stopper 31 disposed on the lefthand side (as shown) of the slide table 14 comprises a micrometer head, while the stopper 32 on the lefthand side of the slide table 14 comprises a permanent magnet having a ground end surface. The slide table 14 can be positioned at a lefthand limit position by pressing a lefthand end 14*a* of the slide table 14 against the micrometer-head stopper 31 with a spring (not shown) disposed within the slide table 14, and at a righthand limit position by magnetically attracting a righthand end 14*b* of the slide table 14 to the end surface of the magnetic stopper 32. The slide table 14 which has been attracted to the magnetic stopper 32 can be disenaged therefrom in one operation by angularly moving the eccentric cam 33 with the lever 34. The released slide table 14 is then pressed at its lefthand end 14*a* against the micrometer-head stopper 31 under the tension of the spring in the slide table 14, whereupon the machining electrode 4 of the machining head 10 is held in confronting relation to the workpiece 1 in the machining bath 2.

Operation of the EDM apparatus thus constructed for forming a minute hole in the workpiece 1 will be described with reference to FIG. 1.

The workpiece 1 is placed in the machining bath 2 filled with an insulative machining solution such as illuminating kerosene. The workpiece 1 may roughly be positioned at this time. Then, the slide table 14 is moved into abutment against the lefthand stopper 31 and stopped. The workpiece 1 is now positioned substantially below the machining electrode 4. The machining electrode 4 is rotated and lowered against the workpiece 1 to form a marking hole in the workpiece 1. The marking hole may be of a size which can be visually recognized.

Then, the machining electrode 4 is raised, and the slide table 14 is moved into abutting engagement with the righthand stopper 32 and stopped there under magnetic forces of the stopper 32. At this time, the workpiece 1 is disposed substantially below the microscope 12. The microscope 12 is then moved by the slides 21a, 21b, 21c attached to the holder 20 for focusing adjustment until the crossing point, serving as the sight, of the cross hairs 15 in the field of view of the microscope 12 is aligned with the center of the marking hole in the workpiece 1. With such adjustment, the position H (FIG. 1) of the machining electrode 4 and the crossing point I of the cross hairs 15 of the microscope 12 are brought into a conjugate relationship through the movement of the slide table 14. The term "conjugate relationship" used herein means the condition in which when the slide table 14 is moved into engagement with the stoppers 31, 32, a desired position on the workpiece 1 in which to form a hole and which is established by the crossing point I of the cross hairs 15 under the microscope 12 coincides with the position of the hole which will actually be formed by the machining electrode 4 at all times. Accordingly, once such a conjugate relationship is established, any desired position on the workpiece 1 which is to be perforated will be positioned directly below the machining electrode 4 by first bringing such a desired position on the workpiece 1 into alignment with the crossing point I of the cross hairs 15 under the microscope 12 and then moving the slide table 14 into abutment against the stopper 31 and stopping the slide table 14 there.

The manner in which a desired position on the workpiece 1 to be perforated is aligned with the crossing point I of the cross hairs 15 in the field of view of the microscope 15 will be described hereinbelow.

After the conjugate relationship has been established between the machining electrode position H and the crossing point position I, the slide table 14 is fixed in abutment against the stopper 32. Then, the workpiece 1 is moved by sliding the slide 14 in the Y direction and the slide 29 in the X direction with the feed screws 18, 13 so that the desired position to be machined will be aligned with the center I of the cross hairs 15. Since the feed screws 18, 13 comprise micrometer heads having a lead of 0.5 mm in the illustrated embodiment, such positioning adjustment can be carried out easily and highly accurately. In this adjustment, the slide table 14 is also moved in the Y direction as the slide 17 below the slide table 14 is moved in the Y direction. However, with the slide table 14 and the slide 17 being movable in mutually perpendicular directions, the conjugate relationship established between the crossing point position I on the microscope 12 and the machining electrode position H is not impaired at all.

After the above positioning adjustment has been effected, the slide table 14 is moved again into abutment against the stopper 31. The desired position on the workpiece 1 to be perforated is now positioned directly below the machining electrode 4 with accuracy since the conjugate relationship has already been established by previously positioning the slide table 14 in engagement with the stoppers 31, 32. The workpiece 1 can then be machined to form a minute hole in the desired position by lowering the energized machining electrode 4 while rotating the same. As described above, once the conjugate relationship has been established, no further positioning adjustment is necessary in successive cycles of machining operation.

Figure 9:
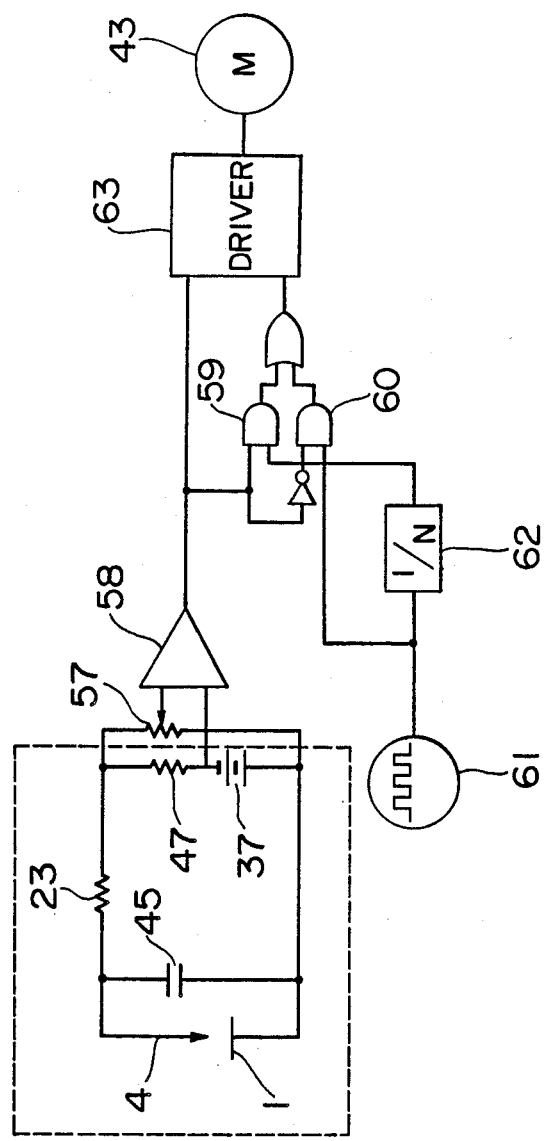
FIG. 9 is a circuit diagram, partly in block form, of a circuit arrangement for an electrical discharge unit and the machining electrode moving mechanism in the electrical discharge machining apparatus.

FIG. 9 schematically illustrates a motor control circuit in which a stepping motor is used for feeding the machining electrode 4 toward the workpiece 1, and also shows an electrical discharge machining circuit. A portion enclosed by a dotted line is the electrical discharge machining circuit, while the remainder serves as the motor control circuit corresponding to the servo control circuit 48 shown in FIG. 2. Denoted at 4 is the machining electrode, 1 the workpiece, 45 the capacitor, 23 the resistor, and 37 the power supply. The motor control circuit includes a machining current monitoring resistor 47, a reference voltage detecting resistor 57, a comparator 58 for comparing voltages generated by the resistors 47, 57, an AND gate 59 for rotating the motor 43 at a low speed, an AND gate 60 for reversing the motor at a high speed on short-circuiting, an oscillator 61 for generating a reference rotation signal, a 1/N counter 62, and a driver amplifier 63 for driving the motor 43.

During a normal electrical discharge, the reference rotation signal is frequency-divided by the 1/N counter 62. A signal from the 1/N counter 62 is applied through the AND gate 59 to the driver amplifier 63 for rotating the motor 43 at a contant low speed. When the machining electrode 4 and the workpiece 1 are short-circuited to cause the comparator 58 to produce a short-circuit signal, the signal from the oscillator 61 goes through the AND gate 60 to the driver amplifier 63 which rotates the motor 43 at a high speed in the opposite direction.

A mode of operation of the electrical discharge machining apparatus in which a number of holes are formed in a workpiece will be described with reference to FIGS. 10A, 10B, 11A, and 11B.

Figure 10A:
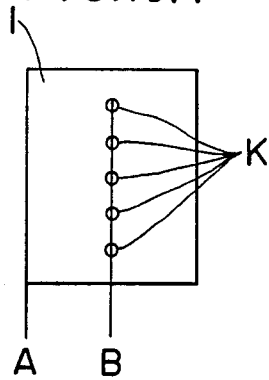
FIGS. 10A and 10B are diagrams illustrative of an angular error caused at the time a number of holes are formed by the electrical discharge machining apparatus of the present invention.
Figure 10B:
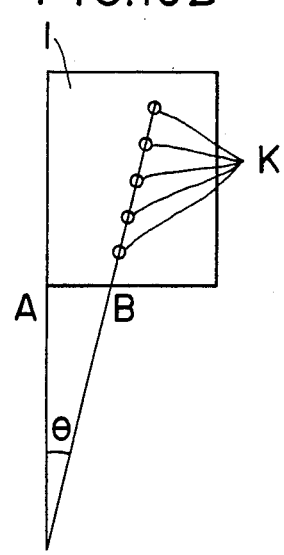

FIG. 10A illustrates a workpiece 1 with a number of holes formed therein along a straight line. For forming a number of such holes K along a straight line in a workpiece, it should generally be questioned how parallel are a reference surface A and a line B connecting the centers of the holes K. Stated otherwise, the angle (FIG. 10B) formed between the reference surface A and the line B should be as small as possible.

Figure 11A:
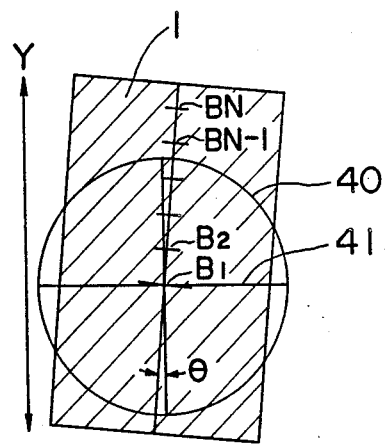
FIGS. 11A and 11B are diagrams explanatory of a process of positioning a workpiece when a number of holes are formed by the electrical discharge machining apparatus of the present invention.
Figure 11B:
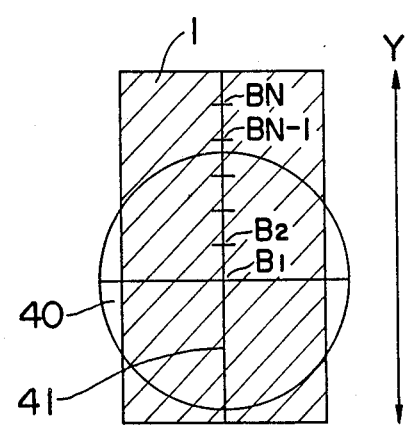

Such desired parallelism between the surface A and the line B can be achieved in the following manner: The machining electrode position H and the microscope position I (FIG. 1) are first brought into conjugate relationship, and then the center of a desired position B1 on the workpiece which is to be perforated is aligned with the crossing point of cross hairs 41 in a field of view 40 of the microscope, as shown in FIG. 11A. In such a condition, the slide 17 (FIG. 1) is moved in the Y direction by means of the feed screw 18 to observe desired positions B2 through BN sucсssively with the microscope 12. If the straight line along which holes are to be formed in the workpiece 1 is not parallel to the Y direction in which the slide 17 is fed, or is inclined to the Y direction through an angle of $\theta$, then the desired machining positions B2 through BN will be seen progressively deviated from the crossing point of the cross hairs 41 of the microscope as the slide 17 is moved in the Y direction. To cope with this, the rotatable slide 26 (FIG. 7) is angularly moved through $\theta$ by means of the adjustment screw 27 until the straight line on the workpiece 1 coincides with the Y direction so that the desired machining positions B2 through BN will not be progressively deviated from the crossing point of the cross hairs 41 when the positions B2 through BN are successively observed with the microscope 12.

After the above adjustment has been performed, the slide table 14 is moved toward the machining electrode 4, and the slide 17 is moved progressively in increments in the Y direction by means of the feed screw 18 while holes are formed in the workpiece 1 successively at the desired positions B1 through BN. The formed holes are accurately aligned along a straight line without suffering from any unwanted angular error with respect to the Y direction or the reference surface.

The positioning mechanism in the EDM apparatus according to the present invention can be incorporated not only in electrical discharge machining for forming minute holes, but also in microdrilling, laser machining, and other types of machining employing the machining head for forming small holes in workpieces.

With the arrangement of the present invention, minute holes can be formed at a high speed in a workpiece at positions accurately determined in a non-contact fashion without any parallax. When the machining electrode is rotated, the electrode core wire therein is subjected to no appreciable displacement relative to the mandrel or rotatable support body, whereby minute holes of small out-of-roundness, high shape accuracy, and surface roughness of 1 micron or smaller can be formed in the workpiece.

Although certain preferred embodiments of the present invention have been shown and described in detail, it should be understood that various changes and modifications may be made therein without departing from the scope of the appended claims.

What is claimed is:

1. An electrical discharge machining apparatus for forming a minute hole in a workpiece, comprising a machining head having a machining electrode for forming the minute hole in the workpiece by an electrical discharge between the machining electrode and the workpiece, machining electrode moving means for moving the machining electrode toward and away from the workpiece, positioning means for establishing a machining position with respect to the workpiece in X and Y directions, said positioning means being positionally adjustble to bring itself into conjugate relationship to said machining electrode, and workpiece moving means for holding and moving the workpiece between a first position directly below said machining electrode and a second position proximate the positioning means, said second position spaced from said first position in a plane to which said direction of movement of said machining electrode extends perpendicularly, further including stop means respectively positioned to define movement of said workpiece into said first and second positions, whereby the workpiece is precisely positioned directly below the machine electrode.

2. An electrical discharge machining apparatus according to claim 1, wherein said machining head comprises support means having V-shaped grooves for supporting said machining electrode therein and rotating means for rotating said machining electrode about its own axis.

3. An electrical discharge machining apparatus according to claim 2, wherein said support means comprises a pair of upper and lower members having said V-shaped grooves, respectively, said machining electrode being supported in said V-shaped grooves against said upper and lower members.

4. An electrical discharge machining apparatus according to claim 2, wherein said support means includes protruding members accommodated therein and having ends projecting on surfaces defining said V-shaped grooves in engagement with said machining electrode.

5. An electrical discharge machining apparatus according to claim 1, wherein said workpiece moving means comprises a machining bath for placing the workpiece therein and a table on which said machining bath is mounted, said machining bath being slidable and angularly movable on said table.

6. An electrical discharge machining apparatus according to claim 2, wherein said rotating means comprises a first pulley mounted on said machining electrode, a motor, a second pulley rotatable by said motor, and a belt trained around said first and second pulleys, said second pulley being disposed upwardly of said first pulley.

7. An electrical discharge machining apparatus according to claim 1, wherein said machining electrode moving means is incorporated in said machining head, said machining head being movable toward and away from the workpiece.

8. An electrical discharge machining apparatus according to claim 2, wherein said machining electrode and said support means are electrically insulated from said rotating means and said machining electrode moving means.

9. An electrical discharge machining apparatus for forming a minute hole in a workpiece, comprising a machining head having a machining electrode for forming the minute hole in the workpiece by an electrical discharge between the machining electrode and the workpiece, machining electrode moving means for moving the machining electrode toward and away from the workpiece, positioning means for establishing a machining position with respect to the workpiece, said positioning means being positionally adjustble to bring itself into conjugate relationship to said machining electrode, and workipiece moving means for holding and moving the workpiece between a first position direclty below said machining electrode and a second position proximate the positioning means, said second position spaced from said first position in a plane to which said direction of movement of said machining electrode extends perpendicularly, wherein said positioning means is disposed in juxtaposed relation to said machining head and movable three-dimensionally, said positioning means including a microscope for directly observing the workpiece.

10. An elelctrical discharge machining apparatus for forming a minute hole in a workpiece, comprising a machining head having a machining electrode for forming the minute hole in the workpiece by an electrical discharge beween the machining electrode and the workpiece, machining eletrode moving means for moving the machining electrode toward and away from the workpiece, positioning means for establishing a machining position with respect to the weorkpiece, said positioning means being positionally adjustable to bring itself into conjugate relationship to said machining electrode, and workpiece moving means for holding and moving the workpiece between a first position directly below said machining electrode and a second position proximate the positioning means, said second position spaced from said first position in a plane to which said direction of movement of said machining electrode extends perpendicularly, wherein said machining electrode moving means includes a lever having an end against which an upper end of said machining electrode is held, a motor, a feed screw axially movable in response to rotation of said motor and held against an opposite end of said lever, said lever having a pivotally supported intermediate portion.

11. An electrical discharge machining apparatus for forming a minute hole in a workpiece, comprising a machining electrode for forming the minute hole in the workpiece by an electrical discharge between the machining electrode and the workpiece, support means having V-shaped grooves for supporting said machining electrode therein, rotating means for rotating said machining electrode about its own axis, machining electrode moving means for moving the machining electrode in a direction toward and away from the workpiece, workpiece moving means for holding and moving the workpiece between a first position directily below said machining electrode and a second position spaced from said first position in a plane to which said direction of movement of said machining electrode extend perpendicularly, first fixing means for fixing said workpiece moving means in said first position, second fixing means for fixing said workpiece moving means in said second position, a microscope disposed upwardly of said second position and movable in said plane, said microscope having a sight for observing the workpiece from above, and positioning means for aligning a position to be machined on the workpiece with said sight of said microscope, said positioning means being positionally adjustable to bring itself into conjugate relationship to said machining electrode.

12. An electrical discharge machining apparatus according to claim 11, wherein said support means comprises a pair of upper and lower members having said v-shaped grooves, respectively, said machining electrode being supported in said V-shaped grooves against said upper and lower members.

13. An electrical discharge machining apparatus according to claim 12, wherein said support means incudes protruding members accommodated therein and having ends projecting on surfaces defining said V-shaped grooves in engagement with said machining electrode.

14. An electrical discharge machining apparatus according to claim 11, wherein said machining electrode moving means includes a lever having an end against which an upper end of said machining electrode is held, a motor, a feed screw axially movable in response to rotation of said motor and held against an opposite end of said lever, said lever having a pivotally supported intermediate portion.

15. An electrical discharge machining apparatus according to claim 11, wherein said rotating means comprises a first pulley mounted on said machining electrode, a motor, a second pulley rotatable by said motor, and a belt trained around said first and second pulleys, said second pulley being disposed upwardly of said first pulley.

16. An electrical discharge machining apparatus according to claim 11, wherein said machining electrode and said support means are electrically insulated from said rotating means and said machining electrode moving means.

17. An electrical discharge machining apparatus according to claim 14, including a motor control circuit for rotating said motor at a certain speed to feed said feed screw at a constant speed to move said machining electrode toward the workpiece while an electrical discharge is being produced between said machining electrode and said workpiece, and for reversing said motor at a higher speed when said machining electrode and said workpiece are short-circuited.

18. An electrical discharge machining apparatus according to claim 11, wherein said first and second fixing means comprises stoppers, respectively, said workpiece moving means being spring-biased into abutment against one of said stoppers and magnetically attractable against the other stopper.

19. An electrical discharge machining apparatus according to claim 11, wherein said workpiece moving means comprises a machining bath for placing the workpiece therein and a movable table on which said machining bath is mounted, said machining bath being slidable on said table in the direction in which said table is movable and being angularly movable on said table.

20. An electrical discharge machining apparatus for forming a minute hole in a workpiece, comprising a base, a machining head mounted on said base and having machining means for foming the minute hole in the workpiece a microscope mounted on said base for observing the workpiece in a direction perpendicular thereto, and a table assembly movably mounted on said base for moving the workpiece in at least first and second directions parallel to said base and perpendicular to each other, said machining head and said microscope being juxtaposed in said first direction in confronting relation to said table assembly, said microscope being movable in said first ansd second directions with respect to said base to bring the microscope into conjugate relation to said machining head, said table assembly comprising a first table for supporting the workpiece, a second table supporting said first table, and a third table mounted on said base and supporting said second table, said frist table having at least one of means for moving the first table in said first direction and means for angularly moving the first table through a small angular interval, one of said second and third tables being slidable in said first direction and the other in said second direction, said table assembly having first holder means for for holding said one of the second and third tables in a first position in which said machining head confronts the workpiece, and second holder means for holding said one of the second and third tables in a second position in which said machining head confronts said microscope.

* * * * *